United States Patent
Ludwig

(10) Patent No.: US 12,023,884 B2
(45) Date of Patent: Jul. 2, 2024

(54) METHOD AND DEVICE FOR PRODUCING A RUBBER COMPONENT

(71) Applicant: Continental Reifen Deutschland GmbH, Hannover (DE)

(72) Inventor: Jens Ludwig, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 296 days.

(21) Appl. No.: 17/595,596

(22) PCT Filed: Mar. 24, 2020

(86) PCT No.: PCT/EP2020/058091
§ 371 (c)(1),
(2) Date: Nov. 19, 2021

(87) PCT Pub. No.: WO2020/233869
PCT Pub. Date: Nov. 26, 2020

(65) Prior Publication Data
US 2022/0227084 A1    Jul. 21, 2022

(30) Foreign Application Priority Data
May 21, 2019    (DE) .................... 10 2019 207 402.2

(51) Int. Cl.
*B32B 37/22*    (2006.01)
*B29C 43/46*    (2006.01)
*B29D 30/00*    (2006.01)

(52) U.S. Cl.
CPC .......... *B29D 30/0061* (2013.01); *B29C 43/46* (2013.01); *B32B 37/226* (2013.01); *B29D 2030/0077* (2013.01); *B32B 2519/02* (2013.01)

(58) Field of Classification Search
CPC .......... Y10T 156/1348; Y10T 156/1788; Y10T 156/1795; B29C 2043/181; B29C 70/38; B32B 37/185; B32B 37/226
(Continued)

(56) References Cited

U.S. PATENT DOCUMENTS

| 6,688,353 B1 | 2/2004 | Koch |
| 9,543,560 B2 | 6/2017 | Yuhara et al. |

(Continued)

FOREIGN PATENT DOCUMENTS

| CN | 106570555 A | 4/2017 |
| DE | 102016215996 A1 | 3/2018 |

(Continued)

OTHER PUBLICATIONS

International Search Report dated Jun. 19, 2020 of International Application PCT/EP2020/058091 on which this application is based.

*Primary Examiner* — Scott W Dodds

(57) ABSTRACT

The invention relates to a method for producing a rubber component (1), in the case of which at least one electronic assembly (2) is embedded between a lower and an upper ply (10, 11) of a rubber material, comprising the steps:
 a) providing a length portion of the lower ply (10) of the rubber material, which is equipped, on the top side (100), with at least one electronic assembly (2);
 b) stationarily positioning the length portion of the lower ply (10);
 c) unrolling a length portion of the upper ply (11) of the rubber material on the top side (100) of the stationary length portion of the lower ply (10) in an unrolling direction (A), and fixedly adhesively connecting the length portions of the plies (10, 11) of the rubber material so as to embed the at least one electronic assembly (2);

(Continued)

d) conveying out the length portion of the rubber component (1).

A corresponding device for producing the rubber components (1) is also specified.

6 Claims, 1 Drawing Sheet

(58) Field of Classification Search
USPC .......................................................... 156/574
See application file for complete search history.

(56) References Cited

U.S. PATENT DOCUMENTS

| | | |
|---|---|---|
| 2010/0078487 A1 | 4/2010 | Baba et al. |
| 2010/0212791 A1 | 8/2010 | Incavo et al. |
| 2011/0284155 A1 | 11/2011 | Sevaille et al. |
| 2020/0147905 A1* | 5/2020 | Shaw ...................... B29C 70/54 |
| 2020/0394489 A1* | 12/2020 | Adam ................ G06K 17/0025 |

FOREIGN PATENT DOCUMENTS

| | | |
|---|---|---|
| EP | 2303553 B1 | 11/2012 |
| JP | 2009208370 A | 9/2009 |
| WO | 2009153271 A1 | 12/2009 |

\* cited by examiner

METHOD AND DEVICE FOR PRODUCING A RUBBER COMPONENT

The invention relates to a method for producing a rubber component, in the case of which at least one electronic assembly is embedded between a lower and an upper ply of a rubber material. The invention also relates to a corresponding device for producing such rubber components.

Increasing numbers of rubber components of the type mentioned in the introduction have recently come onto the market, which rubber components are for example attached to vehicle tires or are incorporated into the tires, which are constructed from multiple components, and which rubber components serve for storing data in readable fashion, for example for the purposes of facilitated material logistics, as proof of authenticity or else for the purposes of storing wear parameters or characteristics of the tire equipped therewith.

The embedding of the electronic assembly between a lower and an upper ply of a rubber material results not only in advantageous robustness with respect to shocks and other vibrations but also unproblematic attachment or integration to or in the tire. Rubber components of the stated type are however not restricted to use on or in tires, but may also be used on other articles.

The electronic assemblies used are commonly in the form of passive radiofrequency transponders and operate without a dedicated electrical supply, such that they are particularly compact and durable. They are commonly referred to as RFID chips.

EP 2 303 553 B1 has disclosed a method and an installation for producing such rubber components, in the case of which the at least one electronic assembly is guided, together with the lower and upper plies of the rubber material that are fed at the same speed, through a roller gap, whereby the lower and upper plies of the rubber material are connected to one another, with the at least one electronic assembly in between, in a laminating process. Such a continuous method is distinguished by high outputs, which however also requires correspondingly high purchase capacities for economic operation, and is disadvantageous with regard to fluctuating on-demand production of such rubber components.

It is an object of the present invention to propose a method and a device of the type mentioned in the introduction which allow simple and flexible production of the rubber components with little outlay even in the presence of changing demand.

To achieve the set object, a method according to the features of patent claim 1 is proposed according to the invention.

A device for achieving the set object is the subject of patent claim 7.

Advantageous configurations and refinements of the invention are the subject of the dependent claims.

The method according to the invention for producing the rubber component provides the sequence of the following steps:

a) providing a length portion of the lower ply of the rubber material, which is equipped, on the top side, with at least one electronic assembly;
b) stationarily positioning the length portion of the lower ply;
c) unrolling a length portion of the upper ply of the rubber material on the top side of the stationary length portion of the lower ply in an unrolling direction, and fixedly adhesively connecting the length portions of the plies of the rubber material so as to embed the at least one electronic assembly;
d) conveying out the length portion of the rubber component.

By means of this sequence, the individual components of the rubber component, specifically the lower and upper plies of the rubber material and the at least one electronic assembly, are not continuously connected to form the rubber component, it rather being the case that the upper ply is applied to the stationarily static lower ply, on which the at least one electronic component is already situated, by unrolling preferably in cyclic fashion, wherein the unrolling movement takes place counter to the actual conveying or production direction.

The composite that is produced, that is to say the finished rubber component, is subsequently conveyed out one portion at a time, wherein, in accordance with one proposal of the invention, this conveying-out movement preferably takes place in a direction which is opposite to the unrolling direction, that is to say in the conveying or production direction.

The length portion of the lower ply may be equipped with at least one electronic assembly, which is positioned and preferably also fixed on the top side, optionally immediately before the upper ply is applied or already in a preceding processing stage.

According to one proposal of the invention, in order to allow cyclically repeating production, as the length portion of the rubber component is conveyed out, a subsequent length portion of the lower ply is provided in accordance with step a), and steps b) to d) are subsequently repeated at least once or even continuously.

In a manner known per se, the rubber component may comprise multiple mutually spaced-apart electronic assemblies, in particular electronic assemblies that are mutually spaced apart at regular intervals, such that, after the rubber component has been conveyed out, a suitable separating device, for example a transverse severing device, is used to sever the rubber component, in each case between adjacent electronic assemblies, transversely with respect to its longitudinal extent running in the production direction, such that individual components are obtained from the rubber component which each comprise a single electronic assembly embedded between the lower and upper plies.

The electronic assemblies embedded between the lower and upper plies during the course of the method according to the invention are not subject to any general restriction, but according to one proposal of the invention are preferably in the form of RFID chips.

As the upper ply is unrolled on the top side, which bears the at least one electronic assembly, of the lower ply, the upper and lower plies of the rubber material are fixedly adhesively connected to one another under the action of pressure and/or heat in a laminating process, for example using corresponding pressure-exerting rollers, which may optionally also be temperature-controlled. Furthermore, radiation heaters may also be provided in order to warm in particular the upper ply, before it is unrolled, to a temperature which is advantageous for the laminating process.

According to one proposal of the invention, the rubber components produced in accordance with the method according to the invention, or the individual components separated out therefrom, are intended for being attached, that is to say connected, to a tire. It is also possible that, already during the process of production of such a tire, prior to the vulcanization thereof, the rubber components or the individual components separated out therefrom are introduced between individual plies of the rubber plies used for the tire construction, such that said components are captively integrated within the tire structure after the vulcanizing process.

The device proposed in the context of the invention for producing such a rubber component which has at least one electronic assembly embedded between a lower and an upper ply of a rubber material comprises equipment for feeding and subsequently stationarily positioning a length portion of the lower ply which bears at least one electronic assembly on the top side, an unrolling device for unrolling and fixedly adhesively connecting a length portion of the upper ply of the rubber material on the top side of the stationarily positioned length portion of the lower ply in an unrolling direction, and means for conveying out the produced length portion of the rubber component.

According to one proposal of the invention, the means for conveying out the produced rubber component are configured such that the rubber component can be caused to be conveyed out in a direction running oppositely to the unrolling direction. In particular, the equipment for feeding the length portion of the lower ply may convey said length portion onward in cyclic fashion after the connection thereof to the upper ply, and in this way convey said length portion out of the device.

The equipment for feeding the length portion of the lower ply may in the simplest case be in the form of supporting and/or guiding rollers. In other embodiments, it may also be anything from a passively or actively operated device up to a cyclically operated belt conveyor, on which the length portion of the lower ply, lying thereon, is fed and discharged.

Stationary positioning of the length portion of the lower ply is to be understood in the context of the invention to mean an interruption of the advancing or the conveyance of the lower ply in the feed direction. During this stationary positioning of the length portion of the lower ply, said length portion pauses without movement whilst the length portion of the upper ply is unrolled on said temporarily static, stationarily positioned lower length portion. Following the unrolling process, the stationary positioning is eliminated again in order to convey out the length portion of the rubber component that has been produced from the length portions of the lower and upper plies, and optionally provide a subsequent length portion of the lower ply and allow the process to begin again from the start.

According to a further proposal of the invention, an item of separating equipment is provided for severing the rubber component between adjacent electronic assemblies so as to form individual components with one electronic assembly, said item of separating equipment being used after the production of the rubber component with multiple embedded electronic assemblies, in particular electronic assemblies embedded at regular intervals.

According to one proposal of the invention, the at least one electronic assembly is formed by an RFID chip, though it is also possible for any other electronic assemblies, for example sensors or the like, to be used and embedded by means of the device according to the invention and the method between a lower and an upper ply of a rubber material.

According to one proposal of the invention, the rubber component or the individual component separated out therefrom is intended for being incorporated into or connected to a tire.

The unrolling device may furthermore be designed to be couplable to the equipment for feeding the length portion of the lower ply and/or to the length portion of the rubber component 1 created as a result of the connection of the length portions of the lower and upper plies 10, 11, such that these are, in the coupled state, movable jointly counter to the unrolling direction for the purposes of conveying out the rubber component and for the purposes of feeding a subsequent length portion of the lower ply.

Further configurations and details of the invention will be presented below on the basis of the schematic and highly simplified drawing, which illustrates an exemplary embodiment. In the drawing:

FIGS. 1 to 3 show, in highly simplified form, a device which serves for producing a rubber component 1, which is used for example in the course of the tire production process.

Figure 1:
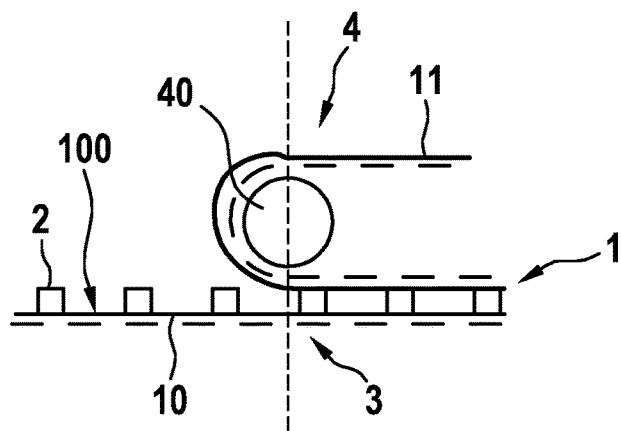
FIG. 1 shows a device according to the invention, which operates in accordance with the method according to the invention, in an initial state.

The rubber component 1 comprises at least one electronic assembly 2, commonly in the form of an RFID chip 2, which is embedded between two plies which lie one on top of the other substantially in parallel, specifically a lower ply 10 and an upper ply 11, of a rubber material.

The lower and upper plies 10, 11 are preferably prefabricated in the form of elongate strip-like portions and are composed of a suitable rubber material, wherein, with regard to the desired embedding of an electronic component 2, which is designed in particular as an RFID chip with transmitting and receiving function, rubber materials with the lowest possible dielectric constant over the common frequency bands of an RFID chip are regarded as being suitable.

To produce such a rubber component 1, a lower ply 10 of the rubber material is fed by means of equipment 3, indicated by the reference designation 3, from a supply device (not illustrated), for example an extruder or a material store. The equipment 3 for feeding the lower ply 10 is designed so as to be operable in cyclic fashion in accordance with demand, but otherwise remain static and immovable. In this respect, the fed lower ply 10 can be provided with a presettable length portion when the equipment 3 is operated and can be temporarily stationarily positioned by subsequent deactivation of the equipment 3.

Furthermore, the device comprises means (likewise not illustrated in any more detail) for applying the at least one electronic assembly 2 to the top side of the fed lower ply 10, such that the lower ply 10, with electronic assemblies 2 already lying on the top side 100 at preferably regular intervals, is fed to the feed device 3 and temporarily stationarily positioned by the latter.

Above the fed and provided length portion of the lower ply 10, there is situated an unrolling device 4 which, in the illustrated exemplary embodiment as per FIG. 1, comprises a diverting roller 40 over which the upper ply 11 of the rubber material runs. Here, the upper ply 11 may also be fed from an extruder (not illustrated) or a supply device, for example a supply roller positioned at a remote location.

In the basic configuration or initial state illustrated in FIG. 1, neither the lower ply 10 with the electronic assemblies 2 positioned thereon nor the upper ply 11 is moved within the unrolling device 4.

Figure 2:
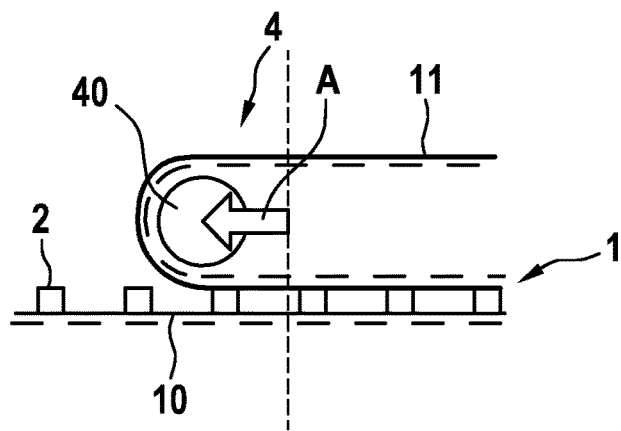
FIG. 2 shows the device as per FIG. 1 during the unrolling of the upper ply.

The production of the rubber component 1, which requires the embedding of the electronic assemblies 2 between the lower and upper plies 10, 11, is effected in that, as per FIG. 2, the unrolling device 4 is moved in an unrolling direction A by a certain preset measure of length, preferably the length of the provided and temporarily stationarily positioned length portion of the lower ply 10, specifically to the left in the illustration as per FIG. 2. Here, a corresponding length portion of the upper ply 11 is unrolled over the length portion of the lower ply 10, which continues to be held stationary, with the electronic assemblies 2 situated thereon, such that said unrolled length portion of the upper ply 11 comes to lie on the top side 100 of the length portion of the lower ply 10, so as to enclose the electronic assemblies 2 that are likewise situated on the top side 100. By way of a sufficiently high pressure exerted by the diverting roller 40, which is possibly also temperature-controlled, the applied pressure and/or heat causes the upper ply 11 to be fixedly adhesively connected to the lower ply 10, so as to enclose the electronic assemblies 2, by lamination.

Subsequently, as per FIG. 3, the unrolling device 4 is for example mechanically coupled to the equipment 3 and/or to the length portion of the rubber component 1 created as a result of the connection of the length portions of the lower and upper plies 10, 11, and is moved back jointly therewith counter to the unrolling direction A, that is to say in a conveying or production direction F, by the length portion previously passed through during the unrolling process, whereby a corresponding length portion of the rubber component 1 thus produced is conveyed out of the device and, at the same time, a subsequent length portion of the lower ply 10 with electronic assemblies situated thereon is fed in, such that the unrolling in the opposite direction A can subsequently take place once again.

For the method discussed above and the device, it is essential that the lamination of the upper ply 11 onto the lower ply 10 and with the electronic assemblies 2 situated thereon takes place discontinuously and whilst the lower ply 10 with the at least one electronic assembly 2 situated thereon is stationarily fixed and in cyclic fashion, because only the upper ply 11 is unrolled by means of the unrolling device 4, counter to the conveying or production direction F, in an unrolling direction A onto the lower ply 10 with the at least one electronic assembly 2.

Figure 3:
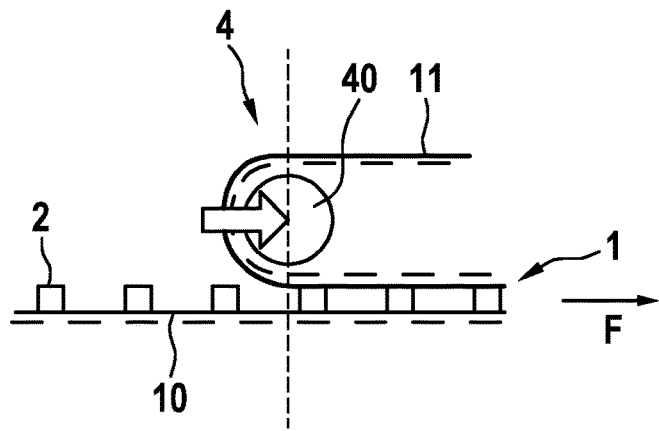
FIG. 3 shows the device as per FIG. 1 as the rubber component is conveyed out.

The above-discussed movement of the unrolling device 4 in the arrow direction A as per FIG. 2 and the subsequent return movement as per FIG. 3 may for example take place over a length of in each case a few millimeters up to several centimeters, for example by 10 mm in each case. In this way, it is possible for a corresponding length portion of the rubber material to be produced and conveyed out with every forward and return stroke in and counter to the arrow direction A, such that, depending on the number of cycles of the device, it is possible to realize anything from on-demand production of individual rubber components up to a quasi-continuous production process.

It is self-evident that the rubber component 1 conveyed out in cyclic fashion may, following the production process, be separated in a separate separating device into individual components, which in particular comprise only a single electronic assembly 2 embedded between the lower and upper plies 10, 11. For this purpose, the produced rubber component is advantageously severed, transversely with respect to the production direction F, between adjacent electronic assemblies 2.

The individual components obtained, each with one embedded electronic assembly 2, can then be individually fastened to a vehicle tire or integrated therein during the production thereof.

A person skilled in the art will however recognize that the method according to the invention and the device are not restricted to the production of rubber components for use on tires, but the produced rubber components and the individual components thereof may also be used for many other applications.

It is self-evident that the lower and upper plies 10, 11 of the rubber material that are used may be of either single-layer or multi-layer form, and may furthermore also be equipped with an adhesion-promoting layer or the like in order to form a good laminated connection.

LIST OF REFERENCE SIGNS

1 Rubber component
2 Electronic assembly
3 Equipment for feeding the lower ply
4 Unrolling device
10 Lower ply
11 Upper ply
40 Diverting roller
100 Top side

The invention claimed is:

1. A method for producing a rubber component having at least one electronic assembly embedded between a lower and an upper ply of a rubber material, the method comprising the steps:
   a) providing a length portion of the lower ply of the rubber material, which is equipped, on the top side with at least one electronic assembly;
   b) stationarily positioning the length portion of the lower ply using equipment;
   c) unrolling a length portion of the upper ply of the rubber material on the top side of the stationarily positioned length portion of the lower ply in an unrolling direction (A) using an unrolling device, and using the unrolling device to fixedly adhesively connect the length portions of the upper and lower plies of the rubber material so as to embed the at least one electronic assembly therebetween and thereby forming a length portion of the rubber component;
   d) coupling the unrolling device to the equipment and/or to the length portion of the rubber component, and while coupled, moving the unrolling device counter to the unrolling direction, thereby conveying out the length portion of the rubber component and feeding a subsequent length portion of the lower ply.

2. The method as claimed in claim 1, wherein the length portion of the rubber component comprises multiple mutually spaced-apart electronic assemblies and, after being conveyed out, is separated into individual components that each comprise one electronic assembly.

3. The method as claimed in claim 1, wherein the at least one electronic assembly is in the form of an RFID chip.

4. The method as claimed in claim 1, wherein the lower ply and the upper ply of the rubber material are fixedly adhesively connected to one another by lamination under the action of pressure and/or heat.

5. The method as claimed in claim 1, wherein the length portion of the rubber component is configured for being incorporated into or connected to a tire.

6. The method as claimed in claim 2, wherein an item of separating equipment is provided that severs the length portion of the rubber component between adjacent ones of the mutually spaced-apart electronic assemblies so as to form the individual component with one electronic assembly.

* * * * *